United States Patent
Loersch

[11] 3,732,769
[45] May 15, 1973

[54] DEVICE FOR APPLYING SLIDE TRANSPARENCY TO MOUNTING

[76] Inventor: Johannes Loersch, Krefelder Strasse 40, Huls, Germany

[22] Filed: Feb. 1, 1971

[21] Appl. No.: 111,204

[30] Foreign Application Priority Data

Jan. 30, 1970  Germany......................P 20 04 095.3

[52] U.S. Cl. ..........................83/176, 83/17, 83/925
[51] Int. Cl. ................................................B26d 7/08
[58] Field of Search....................83/176, 17, 19, 925, 83/926 D

[56] References Cited

UNITED STATES PATENTS

| 3,435,717 | 4/1969 | Macomber | 83/176 |
| 3,510,037 | 5/1970 | Sharpe | 83/176 X |
| 2,721,612 | 10/1955 | Almgren | 83/176 |
| 3,457,815 | 7/1969 | Cahill | 83/176 UX |

Primary Examiner—Andrew R. Juhasz
Assistant Examiner—James F. Coan
Attorney—Mason, Mason & Albright

[57] ABSTRACT

A device for applying slide transparencies to a mount half, a slide tract being included wherein a strip of developed film is led by grooves to over a mount half having two adhesive points on opposite sides of the image window. The track terminates just short of a position directly over a recessed reception table to support the mount half. The film strip is bowed slightly downwardly in a trough-like manner as seen from above by a roller shaped as a hyperboloid which bears on the film strip at its edges just outside of each groove on the track containing the edges of the film. The arrangement provides support for the film so that it extends over the mount half without bending upwardly or downwardly and, when positioned, as desired, is cut by a knife so as to be received in a recess therefor which surrounds the image window with a pair of self sticking adhesive points thereon securing the transparency precisely in place so that it is not dislodged on subsequent movement of the mount half.

5 Claims, 3 Drawing Figures

JOHANNES LOERSCH

DEVICE FOR APPLYING SLIDE TRANSPARENCY TO MOUNTING

SUMMARY AND BACKGROUND OF THE INVENTION

The invention relates to device for mounting slide transparencies. It is known, in particular with machines for the automatic mounting of transparencies, to guide the film strip having the transparencies thereon through a slide track at the end of which a cutting device for the individual transparencies is provided. Co-operating with the cutting device is a supporting table on which a mount half for the transparency is located and onto which the transparency just cut by the cutting device falls where it may, for example, be secured to the mount half by an adhesive point previously placed on the mount half. Thereafter, the second mount half is placed and pressed onto the first whereby the transparency is completely mounted.

In order for the transparency to fall by gravity to the proper position on the mount half, it is necessary that the mount half lie below the level of the film strip. But the distance should not be too large inasmuch as a displacement of the transparency can occur whereby the transparency is not accurately located on the mount half. Further it is important that the transparency to be mounted does not touch the mount half prior to falling thereon inasmuch as the film emulsion may otherwise be damaged. Moreover, there is a tendency for the film strip, which often has just been processed, to curl somewhat which often leads to the situation that the end of the film strip guided into position over the mount half buckles down and thus slides along the mount half.

The invention is therefore directed to the problem of providing a device for mounting transparencies which will function well with films which have been just processed and wherein the film can be positioned a minimal distance above the mount half prior to cutting same.

The solution to the above problem has been the provision, in a device for mounting slide transparencies, of a slide track which contains a guide groove on each of its longer sides for receiving the side edges of the film strip and a roller for pressing down on the film at its sides just outside of the grooves so that the film strip is somewhat warped into a trough-like shape as seen from above. By means of such warping, stability is imparted to the film strip whereby it can be moved outwardly and suspended over the mount half located on a supporting table below the film strip wherein the transparency is separated from the film strip by a cutter.

The two faces of the roller which press down on the film strip have a greater diameter than the intermediate part and preferably the roller is shaped as a one-case hyperboloid.

Preferably also, the roller is spring-loaded and may be raised to facilitate insertion of a new film strip.

Other objects, adaptabilities and capabilities will appear as the description progresses, reference being had to the accompanying drawings, which:

DESCRIPTION OF THE PREFERRED EMBODIMENT

Figure 1:
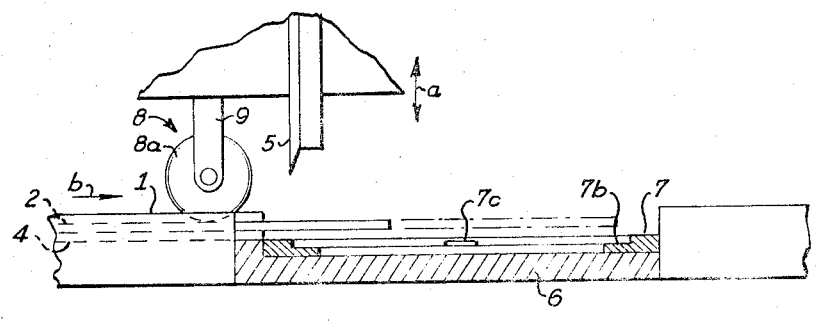
FIG. 1 is a side elevation which is fragmentary and in partial section illustrating the invention.

A film strip 2 having individual transparencies 2a is guided in a slide track 1. It will be noted that slide track 1 is open over film strip 2 on its top, and along its longer sides, contains grooves 3 into which are received the edges 2b of film strip 2. A recess 4 is provided in slide track 1 under film strip 2 and between grooves 3.

A cutter 5 is provided at the end of slide track 1 which is attached to a mechanism which causes it to move vertically as indicated by allow $a$ in response to a predetermined movement of film strip 2. Mechanisms for supporting and actuating cutter 5 are well known in the art.

Figure 2:
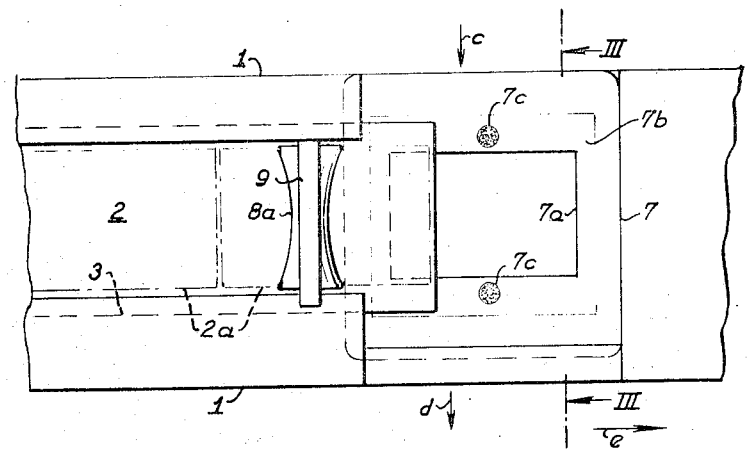
FIG. 2 is a plan view in partial section of the invention.
Figure 3:
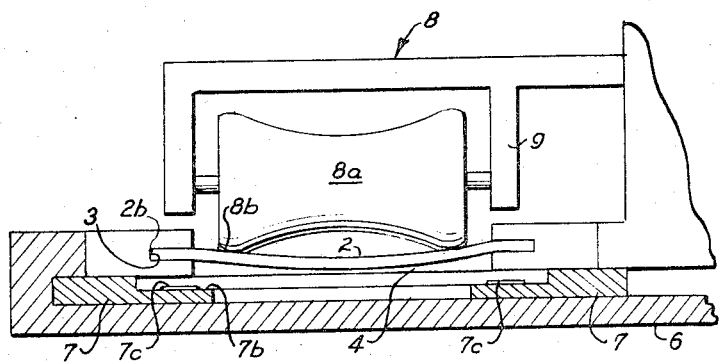
FIG. 3 is a vertical section through the invention taken on section lines III—III of FIG. 2.

A reception table 6, which is movable normally relative to slide track 1, is provided for insertion of a mount half 7 as shown in FIG. 2. Mount half 7 contains a rectangular image window or opening 7a and a recessed portion 7b which approximately corresponds to the thickness of the film strip 2 and into which a cut-off individual transparency 2a is received. For securing cut-off transparency 2a in recessed portion 7b, adhesive points 7c are provided at opposite edges of the image window 7a in recessed portion 7b.

At the end of slide track 1, proximate to and in front of cutter 5, is a film warping means 8 which comprises a supporting bracket 9 with a roller 8a in the shape of a hyperboloid journalled thereon so as to press against the edges of film strip 2 over recess 4 proximate to the edges of grooves 3. The outer larger faces 8b of roller 8a serve to warp film strip 2 in a trough-like manner as seen from above. It will be appreciated that in spite of this warping, film strip 2 does not touch the bottom of slide track 1 due to recess 4 in such track. Accordingly, film strip 2 with its film emulsion is not damaged by sliding along the central area of the track. The warping means 8 is preferably spring-biased against film strip 2 and may selectively be lifted by means not shown for receiving film strip 2 thereunder.

Due to the trough-like warping of film strip 2, it may be moved forward by the length of one transparency 2a in the sense of arrow $b$ to where the transparency is positioned as desired over mount half 7. In the warped condition, film strip 2 may be continuously suspended above recessed portion 7b without buckling while it is being moved forward and thus, in effect, glided into the precise position for cutting over mount half 7. This is desirable because otherwise the film emulsion may be damaged. Moreover, it is important that adhesive points 7c be kept out of contact with film strip 2 until the individual transparency 2a to be severed therefrom is precisely at its desired location over mount half 7.

It will be understood by those skilled in the art that mount half 7 may be fed to supporting table 6 from a cassette (not shown) in the sense of arrow $c$, following which the transparency is inserted onto mount half 7 in recessed portion 7b where it is secured thereto by adhesive points 7c. Thereafter, mount half 7 together with the severed transparency 2a secured thereto is moved from supporting table 6 in the sense of arrow $d$ and finally is moved still further in the sense of arrow $e$ after a second covering mount half has been placed in position over mount half 7.

It is to be appreciated that elements and groups of elements which are conventional and generally widely known in the field to which the invention pertains have not been described in detail inasmuch as their exact nature or type is not necessary for an understanding and use of the invention by persons skilled in the art. Moreover, although the preferred embodiment of the invention has been set forth, it is to be understood that other adaptations and modifications will in view thereof be obvious to one skilled in the art.

Having thus described my invention, what I claim as new and desire to secure by Letters Patent of the United States is:

1. A device for mounting slide transparencies onto a mount half which comprises a slide track for receiving the film strip having the transparencies, a cutting device mounted relative to the end of the slide track, a reception table for supporting mount halves receiving severed transparencies as they are provided at the end of the slide track, guide grooves in the longer sides of the slide track for receiving the side edges of the film strip, a recess in the slide track between the guide grooves whereby the film strip is spaced above said recess when carried in said guide grooves, warping means mounted relative to said slide track for warping the film strip by pressing on same only at locations inwardly of and proximate to the guide grooves over said recess whereby said film strip is warped in a trough-like manner as seen from above and in its warped condition remains spaced above said recess with the portion intended for viewing being untouched by any component of the device.

2. A in accordance with claim 1 wherein said warping means comprises a roller having two faces which press against said film strip, said faces being circular in cross-section and having a larger diameter than the portion of said roller intermediate thereto which is spaced above said film strip.

3. A device in accordance with claim 2 wherein said roller has a shape of a hyperboloid.

4. A device in accordance with claim 1 wherein said warping means is movable in a vertical sense relative to said film strip.

5. A device in accordance with claim 4 wherein said warping device is spring-loaded.

* * * * *